Dec. 26, 1967   A. C. MAGUIRE   3,359,736
JET PROPULSION POWER PLANT FOR AIRCRAFT
Filed Nov. 15, 1965   4 Sheets-Sheet 1
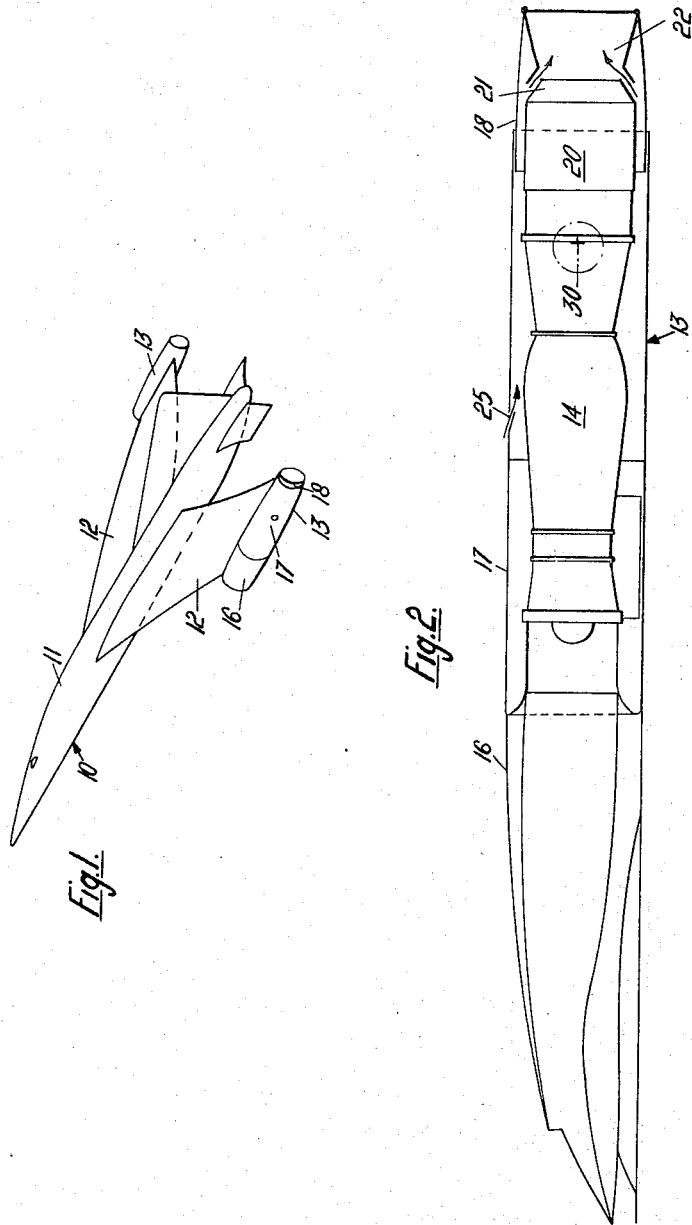

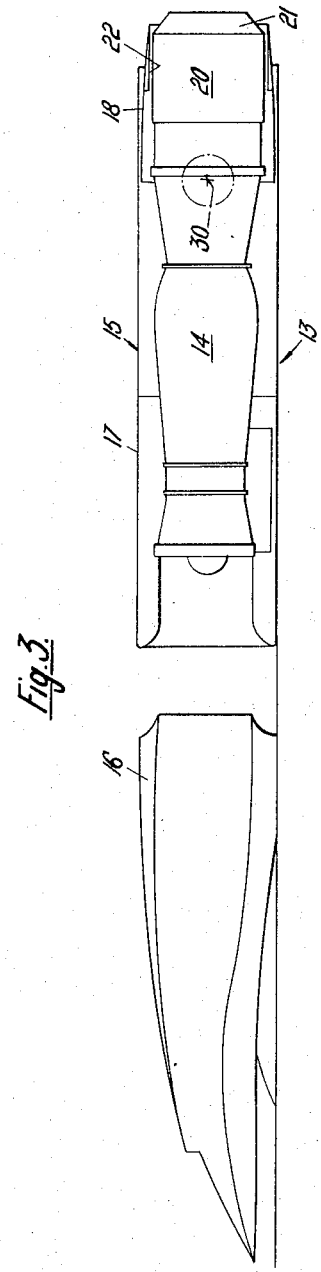

Dec. 26, 1967 A. C. MAGUIRE 3,359,736
JET PROPULSION POWER PLANT FOR AIRCRAFT
Filed Nov. 15, 1965 4 Sheets-Sheet 3
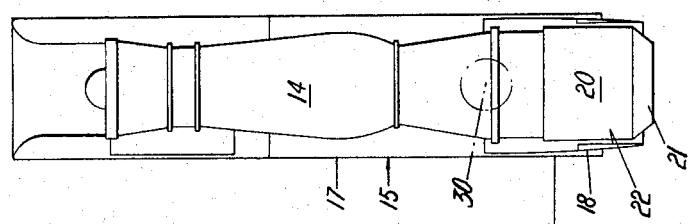
Fig.4.

Dec. 26, 1967 A. C. MAGUIRE 3,359,736
JET PROPULSION POWER PLANT FOR AIRCRAFT
Filed Nov. 15, 1965 4 Sheets-Sheet 4
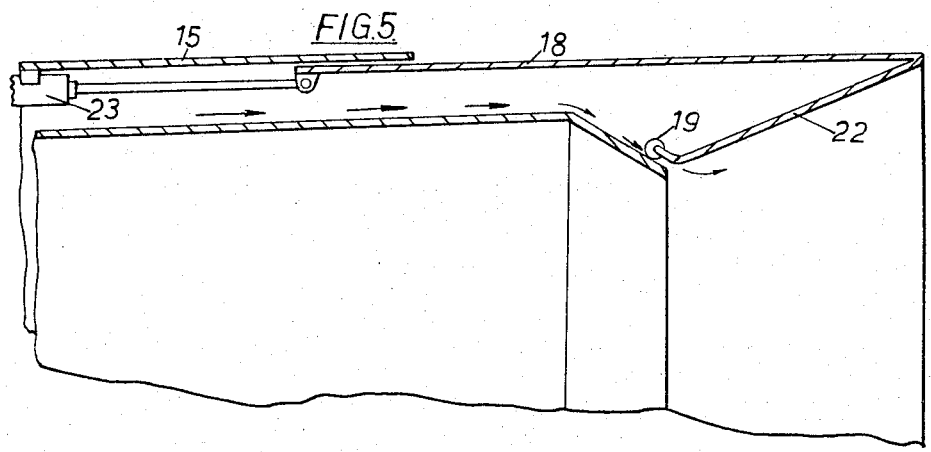
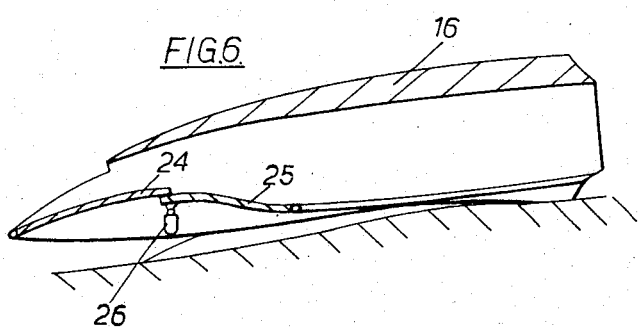
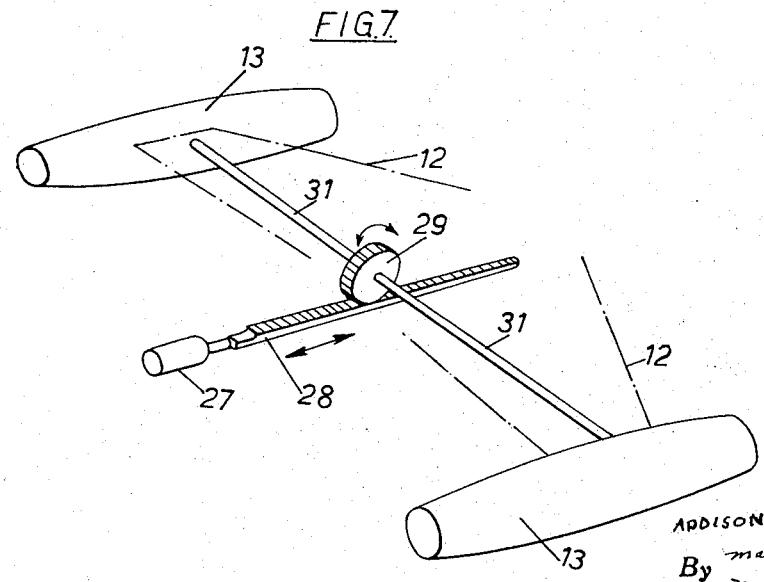
Inventor
ADDISON CHARLES MAGUIRE
By maw kinney
maw kinney
Attorney

United States Patent Office

3,359,736
Patented Dec. 26, 1967

1

3,359,736
JET PROPULSION POWER PLANT FOR AIRCRAFT
Addison Charles Maguire, Alvaston, Derby, England, assignor to Rolls-Royce Limited, Derby, England, a British company
Filed Nov. 15, 1965, Ser. No. 507,934
Claims priority, application Great Britain, Nov. 27, 1964, 48,434/64
8 Claims. (Cl. 60—228)

ABSTRACT OF THE DISCLOSURE

The invention concerns a jet propulsion power plant for aircraft in which the jet propulsion unit is rotatable relative to the intake duct between forward thrust and vertical thrust positions, the jet propulsion unit having a jet nozzle axially movable between convergent and convergent-divergent positions, and the intake duct being axially movable to be connected to or disconnected from the jet propulsion unit.

---

This invention concerns a jet propulsion power plant.

According to the present invention, there is provided a jet propulsion power plant for aircraft adapted for subsonic and supersonic flight, said power plant having an intake duct and a propulsion unit which is rotatable relative to said intake duct between forward propulsion and direct vertical thrust positions, the propulsion unit being provided with a jet pipe and means for forming the downstream end of said jet pipe into a jet nozzle, means for varying the configuration of said jet nozzle between a convergent and a convergent-divergent form.

Preferably means are provided for axially moving the said intake duct with respect to said propulsion unit to selectively connect and disconnect them in said forward propulsion position. The intake may have a variable area throat.

Preferably said means for varying the configuration of said jet nozzle comprise an axially movable annular shroud disposed around said jet pipe for movement between retracted and extended positions in which its downstream end is respectively disposed upstream and spaced downstream of the downstream end of said jet pipe, a plurality of flaps being provided which are pivotally mounted at their downstream ends to the downstream end of said shroud and automatically movable between first and second positions, corresponding to said retracted and extended positions in which the flaps are respectively spaced from the jet pipe so as to be out of the path of the jet gases and form a divergent extension of said jet pipe.

In the preferred embodiment, the upstream ends of said flaps are provided with rollers, the outside surface of said convergent jet pipe providing camming surfaces for said rollers.

The invention also includes an aircraft provided with a jet propulsion power plant as set forth above.

The expression "direct vertical thrust" is intended to mean thrust produced without the aid of aerodynamic surfaces.

The aircraft may have two engines pivotally mounted on the tips of its wings.

The invention is illustrated, merely by way of example, in the accompanying drawings, in which:

2

FIGURE 1 is a perspective view of an aircraft provided with engines pivotally mounted on its wing tips, FIGURE 2 is a sectional elevation of one of the engines shown in FIGURE 1, FIGURE 3 is a view similar to that of FIGURE 2, showing the components in different relative positions, FIGURE 4 is a view of the engine shown in FIGURES 2 and 3 with the components in yet a further relative position, FIGURE 5 is a sectional view of a detail showing the means for varying the configuration of the jet nozzles of the engines, and the means for providing air cooling therefor, FIGURE 6 is a sectional, somewhat diagrammatic view of a detail showing an inlet area varying means, and FIGURE 7 is a diagrammatic perspective view of a detail showing the engine rotating means.

Referring to the drawings, there is shown an aircraft 10 adapted for supersonic flight and vertical take-off and landing, comprising a fuselage 11, wings 12, and propulsion units 13 mounted one on each of the wing tips of the aircraft.

One of the propulsion units 13 is shown in more detail in FIGURE 2, from which it will be noted that it comprises a gas turbine jet propulsion engine 14 mounted within a fairing 15. Fairing 15 essentially comprises three portions, an air intake portion 16 constituting a supersonic intake duct, a housing portion 17 within which the engine 14 is disposed, and a shroud 18 disposed adjacent the downstream end of the engine 14 for axial movement within the housing portion 17. The three portions 16, 17, 18 give the fairing 15 a smooth continuous form to thereby minimise drag.

The engine 14 comprises the usual compressor, combustion equipment, turbine and exhaust duct (within which reheat combustion equipment, not shown, is disposed) and the engine terminates in a jet pipe 20 having a convergent downstream end 21. Shroud 18, which is annular, surrounds the jet pipe 20 and, pivotally attached by their downstream ends to the downstream end of the shroud 18, are a plurality of flaps 22. The upstream ends of the flaps 22 are provided with rollers 19 (see FIGURE 5) which rest upon the external surface of the convergent downstream end 21 of jet pipe 20, which external surface constitutes a cam surface for the rollers.

In the position shown in FIGURE 2, the shroud 18 is in an extended position in which its downstream end is spaced axially from the downstream end of the jet pipe 20. In this position, the flaps 22 form a divergent extension of the nozzle formed by the convergent downstream end 21 of the jet pipe 20. Thus the aircraft is provided with a convergent/divergent exhaust nozzle suitable for supersonic flight.

Rams 23 (see FIGURE 5) are mounted on the housing portion 17 of the fairing 15 and are operable to move the shroud 18 axially from the position shown in FIGURE 2 to the position shown in FIGURE 3, the shroud 18 being slidable within the fixed portion 17 of the fairing 15. In the position shown in FIGURE 3, the downstream end of the shroud 18 is mounted adjacent but upstream of the convergent downstream end 21, and the flaps 22 are disposed closely adjacent to the jet pipe 20 but out of the path of the jet gases. In this position, the jet gases flow only through the convergent downstream end 21, and thus the engine is provided with a convergent nozzle only. This arrangement is particularly suitable for subsonic flight.

Referring again to FIGURE 2, it will be noted that the housing portion 17 of the fairing 15 is provided with apertures 25 through which cooling air may flow into the space between the fairing 15 and the engine 14. This cooling air flows between the upstream ends of the flaps 22 and the convergent downstream end 21 of jet pipe 20 as indicated by the arrows in FIGURES 2 and 5. This cooling air aids in cooling the components subjected to the hot exhaust gases and also prevents premature expansion of gases flowing through the convergent/divergent nozzle.

The air intake portion 16, which is provided for supersonic flight, has a variable area throat. The mechanism for providing this is shown on FIGURE 6, and it may be of conventional design comprising hinged flaps 24, 25 movable radially by ram means 26. The air intake portion 16 is axially movable relative to the engine 14 and to the fixed portion 17, being movable from the position shown in FIGURE 2 to the position shown in FIGURE 3. In the FIGURE 3 position, the air intake portion 16 is spaced axially from the remainder of the propulsion unit. Rams (not shown) are preferably provided for effecting this relative axial movement.

The air intake portion 16 is fixed to the respective wing tip. The remainder of the propulsion unit, i.e. engine 14, the housing portions 17, and the shroud 18, is pivotally mounted on the respective wing tip for rotational movement about an axis 30. Means, shown in FIGURE 7, are provided for effecting the pivotal movement about the axis 30 to move the engine from the position shown in FIGURE 3 to the position shown in FIGURE 4. The said means comprise a ram 27 which can reciprocate a rack 28 in mesh with a pinion 29. The pinion 29 has shafts 31 extending on either side thereof and rigidly secured thereto. The other ends of the shafts 31 are rigidly connected to engines 13. Thus reciprocation of rack 28 by means of ram 27 will cause rotation of the engines 13. In the FIGURE 4 position, the engine is disposed substantially vertically thereby to provide direct vertical thrust for vertical take-off and landing.

In use, assuming that the aircraft is to take off, the various components of the propulsion unit are, for example, disposed in the position shown in FIGURE 4, in which the engine is disposed substantially vertically, and with the shroud 18 retracted. Operation of the engine will therefore provide direct vertical thrust to enable the aircraft to take-off vertically. Since the flight is obviously subsonic at take-off, a convergent nozzle only is used. When a suitable altitude has been reached, the engine is pivoted about axis 30 from the position shown in FIGURE 4 to the position shown in FIGURE 3. In the FIGURE 3 position, the engine is disposed substantially horizontally and is thereby providing forward propulsive thrust. When the aircraft is moving forwardly, the air intake portion 16 is moved axially from the position shown in FIGURE 3 to the position shown in FIGURE 2, in which it thereby provides the supersonic intake to the engine. The engine may then be used for supersonic flight, the shroud 18 being extended from the position shown in FIGURE 3 to the position shown in FIGURE 2, when supersonic flight is achieved, to provide the convergent/divergent exhaust nozzle suitable for such flight.

For vertical landing of the aircraft 10, the procedure outlined above is reversed in that, from the position shown in FIGURE 2, shroud 18 is retracted from the position shown in FIGURE 2 to the position shown in FIGURE 3 to provide a purely convergent nozzle, the aircraft then having slowed from supersonic to subsonic speeds. The air intake portion 16 is extended from the position shown in FIGURE 2 to the position shown in FIGURE 3, the engine is then rotated from the position shown in FIGURE 3 to the position shown in FIGURE 4, in which it will provide direct vertical thrust for the landing procedure.

It will be appreciated that, in addition to providing a particularly simple, yet convenient, nozzle convertible between convergent and convergent/divergent positions, the retractable shroud 18 also provides means for reducing the effective length of fairing 15 and thus of the propulsion unit. This is of particular use when the engine is in the vertical position shown in FIGURE 4, since it will be appreciated that ground clearance is appreciably improved. Thus, the engines, having improved ground clearance, will not cause such great ground erosion as is common with vertical take-off engines.

By rotating the engine 14, the housing portion 17 and the shroud 18 only, and leaving the air intake portion 16 in its substantially horizontal position, less mass must be rotated and therefore the operation is much simpler, a less complex and bulky actuating mechanism is required and a more sensitive control of the pivotal operation can be achieved. Also since the engine is never used for supersonic flight in its substantially vertical position, a more suitable form of intake can be employed in the vertical position and thus more efficient operation of the engine can be effected. It will be appreciated that, instead of employing the form of intake shown in the drawings when the engine is in its vertical position, an inflatable intake can be provided (not shown) to form a bell-mouth opening to the engine, this being a somewhat more efficient intake design for vertical take-off and landing operations. Also, since the air intake portion 16 is not rotated to the vertical position, there will be less resistance to forward movement of the aircraft since less superstructure will be providing drag on the aircraft.

Instead of being movable between only two positions, the flaps 22 may, if desired, be infinitely variable. Also, the convergent downstream end 21 may be constituted by a plurality of pivoted flaps to thereby provide a further infinitely variable nozzle.

I claim:
1. A jet propulsion power plant for aircraft adapted for subsonic and supersonic flight, said power plant having an intake duct and a propulsion unit which is rotatable relative to said intake duct between forward propulsion and direct vertical thrust positions, the propulsion unit being provided with a jet pipe and means for forming the downstream end of said jet pipe into a jet nozzle, means for varying the configuration of said jet nozzle between a convergent and a convergent-divergent form.

2. A jet propulsion power plant as claimed in claim 1 wherein means are provided for axially moving the said intake duct with respect to said propulsion unit to selectively connect and disconnect them in said forward propulsion position.

3. A jet propulsion power plant as claimed in claim 1 wherein the said intake has a variable area throat.

4. A jet propulsion power plant as claimed in claim 1 wherein said means for varying the configuration of said jet nozzle comprise an axially movable annular shroud disposed around said jet pipe for movement between retracted and extended positions in which its downstream end is respectively disposed upstream and spaced downstream of the downstream end of said jet pipe, a plurality of flaps being provided which are pivotally mounted at their downstream ends to the downstream end of said shroud and automatically movable between first and second positions, corresponding to said retracted and extended positions in which the flaps are respectively spaced from the jet pipe so as to be out of the path of the jet gases and form a divergent extension of said jet pipe.

5. A jet propulsion power plant as claimed in claim 4 wherein the power plant is disposed within a fairing, said shroud forming an extension of the fairing and being slidably mounted in a portion thereof.

6. A jet propulsion power plant as claimed in claim 5 wherein means are provided for causing cooling air to flow between said fairing and engine and between the upstream ends of said flaps and the downstream end of said jet pipe.

7. A jet propulsion power plant as claimed in claim 4 wherein in the forward propulsion and direct vertical positions of the engine, said shroud is respectively in its extended and retracted position.

8. A jet propulsion power plant as claimed in claim 4 wherein the upstream ends of said flaps are connected to the convergent downstream end of the jet pipe whereby, upon axial movement of said shroud between said retracted and extended positions, said flaps automatically move between said first and second positions.

References Cited

UNITED STATES PATENTS

| 2,999,656 | 9/1961 | Ward | 60—269 X |
| 3,161,379 | 12/1964 | Lane | 60—270 X |

FOREIGN PATENTS

| 998,358 | 9/1951 | France. |
| 1,280,852 | 11/1961 | France. |
| 951,130 | 3/1964 | Great Britain. |

CARLTON R. CROYLE, *Primary Examiner.*